United States Patent [19]

Furuta et al.

[11] 4,166,676

[45] Sep. 4, 1979

[54] METHOD OF TURNING OFF THE DISPLAY IN ELECTROCHROMIC DISPLAY DEVICES

[75] Inventors: Shigetaro Furuta, Fujisawa; Masachika Yaguchi, Yokohama; Shigeo Fujino, Odawara; Haruhiro Kato, Kawasaki, all of Japan

[73] Assignee: Dai Nippon Toryo Co., Ltd., Osaka, Japan

[21] Appl. No.: 798,489

[22] Filed: May 19, 1977

[30] Foreign Application Priority Data

May 25, 1976 [JP] Japan ................................. 51-60280

[51] Int. Cl.² ............................................. G02F 1/17
[52] U.S. Cl. ..................................... 350/357; 340/785
[58] Field of Search ................... 350/357; 340/324 R, 340/324 M, 336; 307/270

[56] References Cited

U.S. PATENT DOCUMENTS 3,987,433  10/1976  Kennedy ............................ 350/357

Primary Examiner—James W. Davie
Attorney, Agent, or Firm—Gerald J. Ferguson, Jr.; Joseph J. Baker

[57] ABSTRACT

The display in a diffusion type electrochromic display device is turned off with high response by applying an A.C. input voltage having a frequency of one to ten times as high as the cut-off frequency. The diffusion type electrochromic display device is an EC display device which uses an EC composition consisting of an EC compound coloring in a reduced state and a solvent in which the solubility of the compound to the solvent is $10^{-2}$ mol/(100 g solvent) or more in a reduced state and $10^{-1}$ mol/(100 g solvent) or more in an oxidized state. The cut-off frequency is a critical frequency at a freqency higher than which the oxidization or reduction of the EC compound cannot follow the change in the input voltage, which is normally 20 to 50 Hz.

5 Claims, 16 Drawing Figures

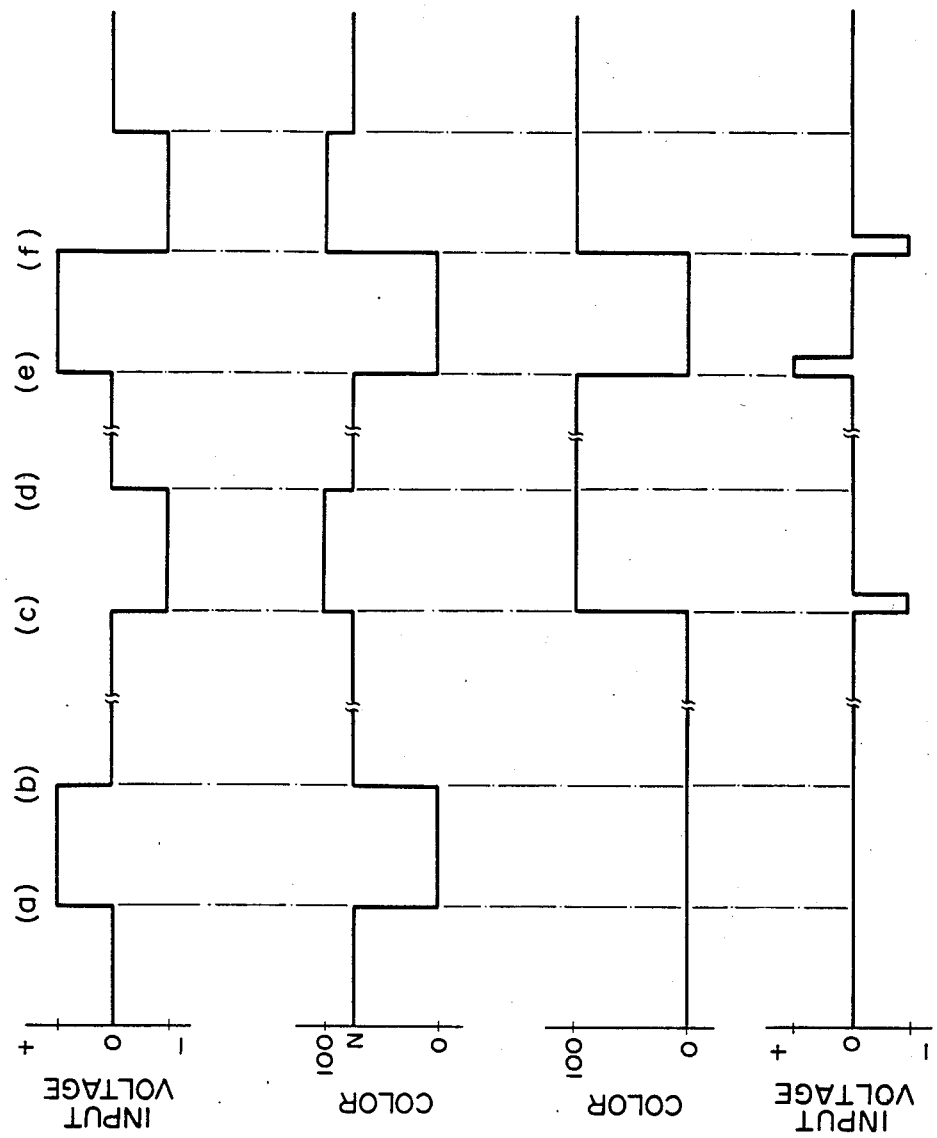

METHOD OF TURNING OFF THE DISPLAY IN ELECTROCHROMIC DISPLAY DEVICES

BACKGROUND OF THE INVENTION

1. Field of the Invention

This invention relates to a method of turning on and off the display of an electrochromic display device, and more particularly to a method of turning off the display of a diffusion type (hereinafter described in detail) electrochromic display device.

2. Description of the Prior Art

It has been known in the art that an electrochromic compound presents different colors according to its state, whether it is oxidized or reduced. This is because the spectroscopic absorption is different according to its state. The electroscopic compounds are divided into inorganic compounds and organic compounds. As disclosed in U.S. Pat. No. 3,827,784, various metal oxides are known as the inorganic electrochromic compounds such as tungsten oxide ($WO_3$) and molybdenum oxide ($MoO_3$). As the organic electrochromic compounds are known pyridine compounds and aminoquinone compounds for instance, as disclosed in U.S. Pat. No. 3,862,842 and J. Electrochem. Soc. Vol. 121, No. 12, P1555-1558. The inorganic electrochromic compounds are used in the state of solid or solution dispersed in a liquid. The organic electrochromic compounds are used in the state of solution solved in a liquid.

The electrochromic compound (hereinafter referred to simply as "EC compound") is further divided into two kinds according to its state in which it is colored, i.e. an EC compound coloring in a reduced state and an EC compound coloring in an oxidized state. The EC compound coloring in a reduced state is colored in a reduced state and is turned to colorless and transparent or to a different light color when it is oxidized. The EC compound coloring in an oxidized state is colored in the oxidized state and is turned to coloress and transparent or to a different light color when it is reduced.

Thus, the EC compound presents different color according to its state. Therefore, it is possible to make a display device by putting the EC compound in a cell having oppositely disposed electrodes at least one of which is transparent and applying a voltage across the cell. The color observed from outside on the transparent electrode changes in the pattern of the electrode when the voltage application across the cell is turned on or off.

There has been proposed to provide a diffusion type EC display device in a copending U.S. Patent Application Ser. No. 769,564. The diffusion type EC display device is an EC display device composed of a pair of oppositely disposed electrode plates at least one of which is transparent, and an EC composition sealed between the pair of electrode plates. The EC composition is composed of an EC compound coloring in a reduced state and a solvent. The EC compound coloring in a reduced state is sealed between the electrode plates in a reducing atmosphere. The solubility of the EC compound to the solvent is $10^{-2}$ mol/(100 g solvent) or more in a reduced state and $10^{-1}$ mol/(100 g solvent) or more in an oxidized state. The solvent is preferably composed of water and at least 70% by weight of alcohol. The alcohol is desirably polyhydric alcohol.

In operation of the diffusion type EC display device, the EC compound coloring in a reduced state is sealed in a cell in a reduced state. The diffusion type EC display device presents a colored pattern when no electric field is applied thereto. When an electric field is applied, the EC compound changes it color to the colorless and transparent state whereby a white color of emulsion or a color of a pigment appears on the anode upon application of an electric field. The anode is formed in a pattern to be displayed so that the change in color from the color of the EC compound in a reduced state to the color of pigment or emulsion is displayed in the form of the pattern. Upon turning off of the electric field, the oxidized EC compound immediately diffuses into the solvent and accordingly the displayed pattern quickly disappears.

The diffusion type EC display device is advantageous over the conventional "memory type" EC display device in that the display can be conducted by use of a lower voltage and the life is long. The "memory type" EC display device means the conventional EC display device using an EC composition in which the EC compound is hard to diffuse and accordingly the turn on and off of the display is carried out by applying a positive and negative potential to the cell. That is, when the display is to be provided, a positive potential is applied, and when the display is to be erased a negative potential is applied.

In contrast to the memory type display device, in the diffusion type display device the display can be turn on and off by simply turning on and off the application of the voltage across the cell. In the diffusion type EC display device, however, the fall time is markedly long in comparison with the rise time. The fall time is as long as several hundreds milliseconds to severals seconds, while the rise time is about 100 to 400 milliseconds. Therefore, the diffusion type EC display device cannot be used as a display in which a quick response is required such as a second display in a digital watch.

SUMMARY OF THE INVENTION

It is therefore the primary object of the present invention to provide a method of turning off the display in a diffusion type EC display device which enables the display to disappear in an extremely short time by shortening the fall time of the display.

Another object of the present invention is to provide a method of turning off the display in a diffusion type EC display device in which the commercially available A.C. power source can be used.

The above objects of the present invention are accomplished by applying an alternating current having a higher frequency than the cut-off frequency (hereinafter defined) to the cell when the display is to be erased. The cut-off frequency is a critical frequency at a frequency higher than which the oxidization or reduction of the EC compound cannot follow the input potential, which is normally 20 to 50 Hz. The alternating current (hereinafter referred to simply as A.C.) which is to be applied to the cell to erase the display in the diffusion type EC display device in accordance with the present invention should have a frequency equal to or higher than but not higher than ten times as high as the cut-off frequency.

By applying the A.C. input having the above defined frequency, i.e. one to ten times as high as the cut-off frequency, to the diffusion type EC display device, the fall time of the display is markedly shortened.

BRIEF DESCRIPTION OF THE DRAWING

FIG. 2A is a diagram showing the input voltage applied to the normal diffusion type EC display device, FIG. 2B is a diagram showing the change in color of the EC display device excited by the input voltage as shown in FIG. 2A, FIG. 2C is a diagram showing the change in color of the memory type EC display device excited by the input voltage as shown in FIG. 2A, FIG. 2D is a diagram showing the input voltage normally applied to the memory type EC display device to effect the change in color as shown in FIG. 2C.

DESCRIPTION OF THE PREFERRED EMBODIMENTS

Preferred embodiments of the present invention will be described in detail hereinafter. Before describing the embodiments, the general description of the EC display device will be made with reference to the accompanying drawings.

Figure 1:
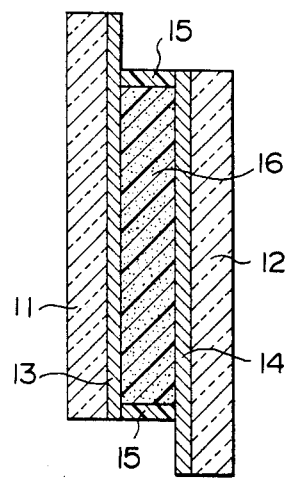
FIG. 1 is a cross sectional view of an EC display device to which the method in accordance with the present invention is applied.

Referring to FIG. 1, a pair of electrode plates 11 and 12 are oppositely disposed and are provided on the inner surface thereof with electrode layers 13 and 14. Between the pair of oppositely disposed electrode plates 11 and 12 is provided a spacer 15 to form a space between the electrode plates 11 and 12 enclosed by the spacer 15 and the electrode layers 13 and 14. The space is filled with an EC composition 16. The EC composition 16 is composed of an EC compound coloring-in a reduced state, a solvent and a hiding agent of white pigment such as titanium oxide. Thus, prepared EC display device is used as a reflection type EC display which represents a pattern viewed on the surface of the electrode plate from outside.

The display of a pattern changing in color will be described in detail hereinbelow with reference to FIGS. 2A to 2D. When the EC display device of diffusion type as used in the present invention is subjected to an electric field obtained by the input voltage as shown in FIG. 2A, the color of the pattern displayed changes as shown in FIG. 2B. The color of the reduced EC composition when no electric potential is applied is indicated at N on the color scale of FIG. 2B. When the electric potential is applied in one direction (e.g. positive potential), the color displayed on the anode side electrode plate is changed from N to 0, which means that the color disappears and the color of the white pigment appears on the anode. That is, the color of the reduced EC compound changes from N to white which is represented by 0. Then, when the potential is removed at (b) in FIG. 2A, the color is turned to its original color N. Further, when a negative potential is applied, the color displayed on the anode changes from N to 100 as shown at (c). When the negative potential is removed at (d), the color is returned to its original color N again. If the positive and engative potentials are alternately applied, the color is changed from 100 to 0, and 0 to 100, repeatedly. The color N is a mixed color of the color of the reduced EC compound and the color of the white pigment. By changing the concentration of the reduced EC compound, the color N can be changed as desired between 100 and 0.

FIG. 2C shows the change in color of a pattern displayed in a conventional EC display device of memory type. The color displayed zero when no potential is applied. When a positive potential is applied, the color is not changed. When a negative potential is applied, the color is changed from 0 to 100 as shown at (c). Even when the negative potential is removed, the color is not changed from 100 as shown at (d). Only when the positive potential is applied, the color is changed from 100 to 0. In order to effect the above change in color in the conventional memory type EC display device, the application of the potential is normally conducted as shown in FIG. 2D. Only when the positive or negative potential is applied as shown at (c), (e) and (f), the color changed from 0 to 100 or 100 to 0.

Figure 3A:
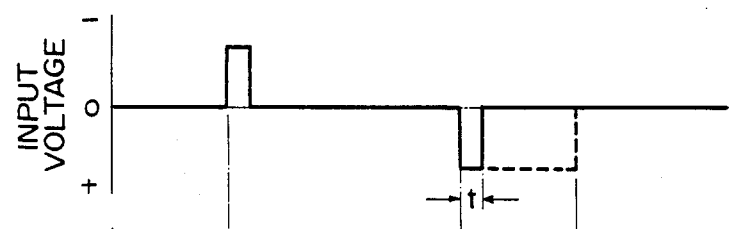
FIG. 3A is a diagram showing the input voltage applied to a memory type EC display device.
Figure 3B:
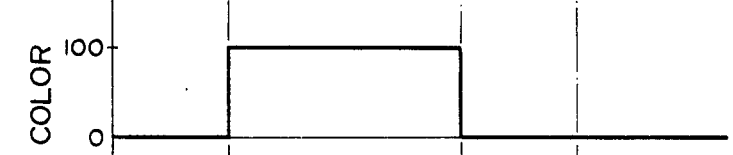
FIG. 3B is a diagram showing the change in color of the memory type EC display device excited by the input voltage as shown in FIG. 3A.
Figure 3C:
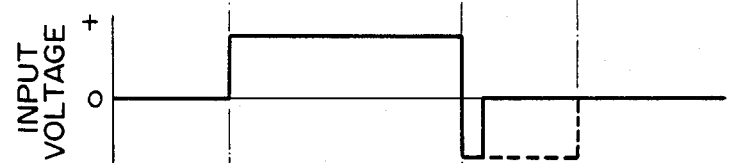
FIG. 3C is a diagram showing the input voltage applied to a diffusion type EC display device.
Figure 3D:
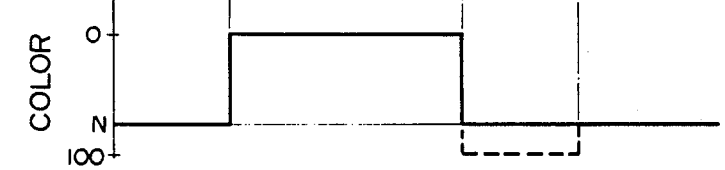
FIG. 3D is a diagram showing the change in color of the diffusion type EC display device excited by the input voltage as shown in FIG. 3C.

The relation between the input voltage and the change in color of the display device controlled thereby will be hereinbelow described in further detail with reference to FIGS. 3A to 3D, in which FIGS. 3A and 3B show that of the conventional memory type EC display device and FIGS. 3C and 3D show that of the diffusion type EC display device. In the memory type EC display device, the turning on and off of the display can be conducted by applying a positive and negative pulse as shown in FIG. 3A. The width or duration t of the pulse may be of any value. In the diffusion type EC display device also, the turning off of the display can be conducted by applying a negative potential as shown in FIG. 3C. However, in this case, the duration of the application of the negative pulse to erase the display should not be too long since the displayed color would change from 0 to 100 over the original color N if the duration of the application of the negative potential is too long as shown with broken lines in FIGS. 3C and 3D. Therefore, in order to prevent the above phenomenon, it is necessary to provide a special control circuit to limit the duration of application of the negative potential.

Figure 4A:
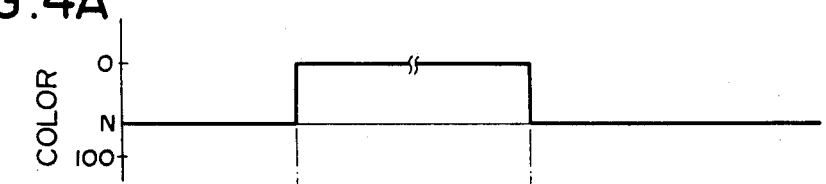
FIG. 4A is a diagram showing the change in color which is desired to be obtained in a diffusion type EC display device.
Figure 4B:
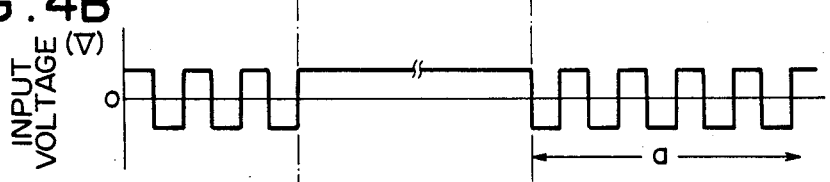
FIG. 4B is a diagram showing the input voltage applied to the diffusion type EC display device to obtain the change in color as shown in FIG. 4A by use of a method of turning on and off the display in accordance with an embodiment of the present invention.
Figure 4C:
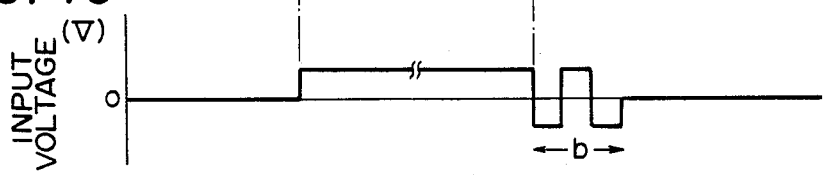
FIG. 4C is a diagram showing the input voltage applied to the diffusion type EC display device to obtain the change in color as shown in FIG. 4A in accordance with another embodiment of the present invention.

In accordance with the method of turning off (erasing) the display in a diffusion type EC display device of the present invention, the above mentioned control circuit is not necessary. The method in accordance with the present invention will be described hereinbelow in detail with reference to FIGS. 4A to 4C. FIG. 4A shows the color in change which is desired to be obtained. FIG. 4B shows an embodiment of the method in which an A.C. input voltage is applied to turn off the display. FIG. 4C shows another embodiment of the method in which an A.C. input voltage is applied to turn off the display.

Referring to FIG. 4B, an A.C. input voltage is applied to the diffusion type EC display device while the display is to be OFF, and a positive D.C. input voltage is applied thereto while the display is to be ON. The frequency of the A.C. input voltage is higher than the cut-off frequency of the display device and not higher than ten times as high as the cut-off frequency. If the frequency of the input voltage is lower than the cutt-off frequency, the display will follow the change in voltage and accordingly the turning on and off of the display will be repeated. On the other hand, if the frequency of the input voltage is higher than ten times as high as the cut-off frequency, the fall time of the display i.e. the time to completely turn off the display is not shortened according to the tests conducted by the inventors. Between one to ten times as high as the cut-off frequency, one to four times is particularly preferred in order to display a second indication in a watch. The duration of the application of the A.C. input voltage may be as long as desired. However, from the economical viewpoint and the life of the display, it is desirable to stop the application as soon as the display has been turned off as shown in at b in FIG. 4C. However, on the other hand, in a display device including a plurality of EC display segments, it will sometimes occur that a small amount of current flows from a turned on segment to a turned off segment which results in crosstalk, if the turned off segments are not applied with the A.C. input voltage. By applying the A.C. voltage to the segments even after the display has been completely erased the crosstalk can be prevented. It is, therefore, desirable to constantly apply the A.C. voltage while the display is to be turned off in order to obtain a display of high quality.

Figure 5A:
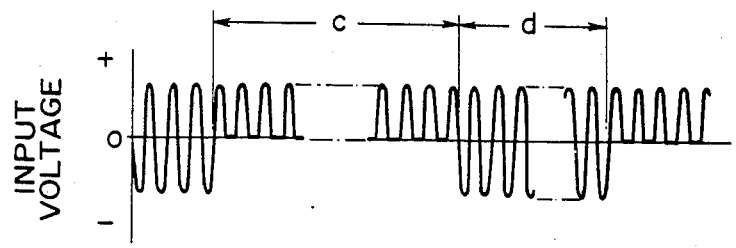
FIG. 5A is a diagram showing the input voltage applied to the diffusion type EC display device in accordance with still another embodiment of the present invention.
Figure 5B:
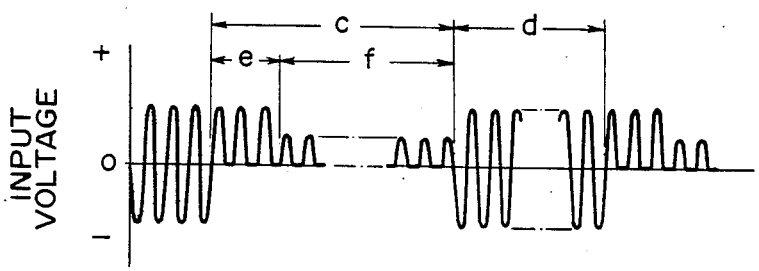
FIG. 5B is a diagram showing the input voltage applied to the diffusion type EC display device in accordance with a further embodiment of the present invention.
Figure 6:
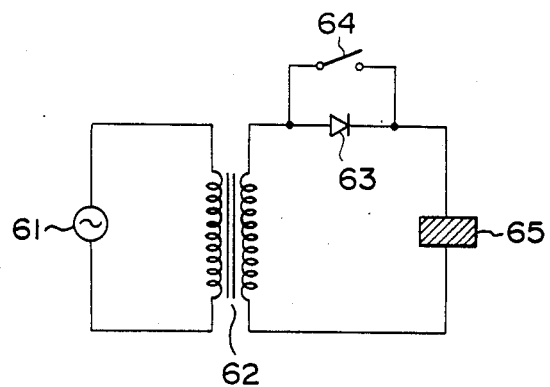
FIG. 6 is a circuit view showing an example of an electric circuit for controlling the display of the diffusion type EC display device in accordance with the method of the present invention which can be used to obtain the input voltage as shown in FIG. 5A.

In the above described embodiments shown in FIGS. 4B and 4C, the turning on of the display is conducted by a D.C. input. However, it is possible and in one sense preferred to turn on the display by applying a rectified unidirectional pulses as shown in FIGS. 5A and 5B. In FIG. 5A, the unidirectional pulses which can be obtained by rectifying an A.C. input is indicated at c. While the unidirectional pulses are applied to the diffusion type EC display device, the display is turned on. When the display is to be turned off, a normal A.C. input is applied as indicated at d. The frequency of the unidirectional pulses should be higher than the cut-off frequency. If the frequency of the unidirectional pulses and that of the A.C. input are equal to each other, it is easy to obtain the unidirectional pulses by simply rectifying the A.C. input. Since the cut-off frequency is 20 to 50 Hz, the A.C. input can be simply obtained by stepping down the commercially available A.C. source of 50 to 60 Hz. In order to perform the above display, an electric circuit as shown in FIG. 6 can be used. Referring to FIG. 6, a commertially available A.C. power source of 100 V, 50–60 Hz indicated at 61 is connected with a transducer 62 which steps down the potential of the source 61. The transducer 62 is connected with a parallel circuit of a diode 63 and a switch 64. The diode 63 is preferred to be a crystal diode having no voltage drop. The transducer 62 is connected across a diffusion type EC display device 65 by way of the parallel circuit of the diode 63 and the switch 64. The diode 63 is connected between the EC display device 65 and the transducer 62 to rectify the A.C. output from the transducer 62 to make a display turned on. When the display is to be turned off, the switch 64 is closed to short-circuit the diode 63 to apply the A.C. input to the EC display device 65 as indicated at d in FIG. 5A.

In the embodiment shown in FIG. 5B, the potential of the unidirectional pulses given to the EC display device during the period of c is lowered as shown at f except in the initial stage e to save the power. This can be done since the potential required for maintaining the display is lower than the potential required for initiating the display. In operation, the A.C. input is first rectified to turn on the display and then the potential is lowered as shown at f. When the display is to be turned off, the rectification and the lowering of the potential are stopped as shown at d in FIG. 5B.

The form of the wave of the input potential has been described or illustrated as being square or sine wave. However, it will be noted that the waveform may be of any type as desired.

Now the present invention will further be described in detail with reference to several examples thereof.

EXAMPLE 1

An EC composition consisting of 5% by weight of $\gamma,\gamma'$-dimethylbipyridinium dibromide, 50% by weight of titanium oxide and 45% by weight of water was interposed between a pair of glass plates having an area of 100 cm$^2$ and carrying thereon a transparent electrode of $In_2O_3$ having a surface resistance of 10 Ω oppositely disposed with a space of 0.5 mm formed therebetween to make a diffusion type EC display device. When an input of square wave of $2V_{o-p}$ and 0.5 Hz was applied to the above EC display device, the fall time of the display was longer than one second and accordingly the response of the display was impractically slow. Then, in accordance with the present invention, a square of 25Hz was applied when the display was to be turned off. Then, the fall time was shortened to 0.3 second and a practically favorable display could effected. The cut-off frequency of the above prepared EC display device was 23 Hz.

Thereafter, sine waves, triangular waves and ramp waves of 25 Hz and 100 Hz were applied to the EC device. When the potential was equal to that of the square wave applied, the fall time of the display was almost the same as effected in the above example.

EXAMPLE 2

The EC composition used in Example 1 was interposed between a pair of glass plates having an area of 25 cm$^2$ and carrying thereon a transparent electrode of $SnO_2$ having a surface resistance of 20 Ω oppositely disposed with a space of 0.1 mm formed therebetween to make a diffusion type EC display device. The display color was changed to violet to white when an input potential of $1.5V_{0-p}$ was applied. The cut-off frequency was 28 Hz. When a square wave of $1.5V_{0-p}$ and 0.5 Hz was applied to the EC display device, the rise time was 0.3 second, but the fall time was longer than one second. Then, in accordance with the present invention, a square wave of 100 Hz was applied to the EC device during the time in which the display was to be turned off. The fall time was shortened to 0.4 second.

Sine waves, triangular waves and ramp waves of 25 Hz and 100 Hz and of the same potential as said square wave were applied to the EC display device. The response of the display device was almost the same as that effected in the above.

EXAMPLE 3

In the Example 2, the application of the square wave for turning off the display was conducted only for 0.4 second. The rise time was 0.3 second and the fall time was 0.4 second.

EXAMPLE 4

An EC composition consisting of 5% by weight of γ,γ'-dimethylbipyridinium chloride, 40% by weight of titanium oxide and 55% by weight of water was interposed between a pair of glass plates having an area of 50 cm$^2$ and carrying thereon a transparent electrode of In$_2$O$_3$ having a surface resistance of 15 Ω oppositely disposed with a space of 0.1 mm formed therebetween to make a diffusion type EC display device. The cut-off frequency of the EC display device was 25 Hz.

Figure 7:
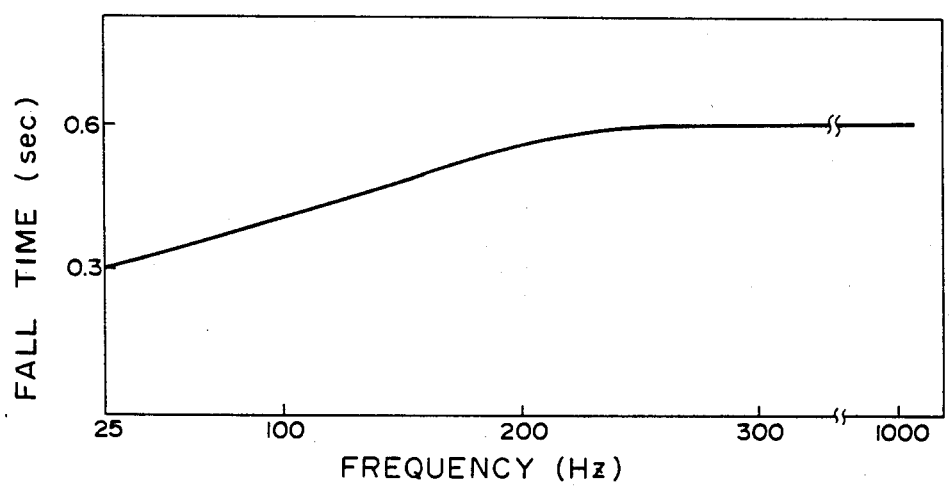
FIG. 7 is a diagram showing the relaion between the A.C. frequency of the input voltage and the fall time of the display.

As shown in FIG. 7, when the frequency of the turning off square wave was almost the same as the cut-off frequency, the fall time was about 0.3 second which is about a half of the fall time effected when the square wave was not applied to the display device. When the frequency of the square wave was four times (100 Hz) as high as the cut-off frequency, the fall time was about 0.4 second. When the frequency was ten times (250 Hz) as high as the cut-off frequency, the fall time was a little shortened. Thus, the fall time was shortened when the frequency was one to ten times as high as the cut-off frequency, and markedly shortened when the frequency was one to four times as high as the cut-off frequency.

EXAMPLE 5

THe EC display device as prepared in Example 4 was used. The electric circuit as shown in FIG. 6 was used to apply an input voltage as shown in FIG. 5A to the EC display device. The power source was a commercially commertially available A.C. source of 100 V and 50 Hz. The potential of 100 V was stepped down to 1 V. The rise time of the display was 0.3 second and the fall time was 0.35 second.

EXAMPLE 6

The EC display device as prepared in Example 4 was used and the electric circuit as shown in FIG. 6 was used. In addition, means was provided for lowering the potential of the rectified input after a predetermined time has lapsed since the rectification started to effect the application of the input voltage as shown in FIG. 5B. The input voltage of 1 V stepped down in quite the same manner as in Example 5 was lowered to 0.5 V when one second has lapsed since the rectification started. The fall time was 0.3 second.

We claim:

1. In a method of controlling the display in a diffusion type electrochromic display device composed of a pair of oppositely disposed electrode plates at least one of which is transparent and an electrochromic composition sealed between said electrode plates, said electrochromic composition being composed of a solvent and an electrochromic compound coloring in a reduced state sealed between said electrode plates in a reducing atmosphere, the solubility of the electrochromic compound to the solvent being $10^{-2}$ mol/(100 g solvent) or more in a reduced state and $10^{-1}$ mol/(100 g solvent) or more in an oxidized state, the method of turning off the display in said display device comprising applying an alternating current input potential having a frequency of one to ten times as high as the cut-off frequency of said display device to said electrode plates of said display device, said alternating current input potential being applied to the electrode plates at least until the display is completely turned off.

2. A method of turning off the display in a diffusion type electrochromic display device as defined in claim 1 wherein the frequency of said alternating current input potential to be applied to the display device to turn off the display is one to four times as high as the cut-off frequency.

3. A method of turning off the display in a diffusion type electrochromic display device as defined in claim 1 wherein said alternating current input potential is a square wave.

4. A method of turning off the display in a diffusion type electrochromic display device as defined in claim 1 wherein said alternating current input potential is a sine wave which is obtained from commercially available A.C. source.

5. A method of turning off the display in a diffusion type electrochromic display device as defined in claim 1 wherein said alternating current input potential remains applied to the display device after the display is turned off.

* * * * *